US007011767B2

(12) United States Patent
Gasper et al.

(10) Patent No.: US 7,011,767 B2
(45) Date of Patent: Mar. 14, 2006

(54) LIQUID PIGMENT DISPERSION AND CURATIVE AGENTS

(75) Inventors: Kelly J. Gasper, Lower Burrell, PA (US); Constantine A. Kondos, Pittsburgh, PA (US)

(73) Assignee: PPG Industries Ohio, Inc., Cleveland, OH (US)

( * ) Notice: Subject to any disclaimer, the term of this patent is extended or adjusted under 35 U.S.C. 154(b) by 59 days.

(21) Appl. No.: 10/339,808

(22) Filed: Jan. 10, 2003

(65) Prior Publication Data

US 2004/0138365 A1 Jul. 15, 2004

(51) Int. Cl.
*C09K 3/00* (2006.01)

(52) U.S. Cl. .................... 252/182.24; 106/436; 516/33

(58) Field of Classification Search ........... 252/182.24; 106/436; 516/33
See application file for complete search history.

(56) References Cited

U.S. PATENT DOCUMENTS

| | | | | |
|---|---|---|---|---|
| 4,322,328 | A * | 3/1982 | Graetz et al. | 524/458 |
| 4,342,672 | A * | 8/1982 | Lindroth et al. | 524/29 |
| 4,381,379 | A * | 4/1983 | Toga et al. | 525/444 |
| 4,390,658 | A * | 6/1983 | Graetz et al. | 524/512 |
| 4,425,469 | A * | 1/1984 | Emmons et al. | 524/750 |
| 4,894,430 | A * | 1/1990 | Hohlein et al. | 528/75 |
| 4,975,119 | A * | 12/1990 | Cooperman | 106/271 |
| 5,076,373 | A | 12/1991 | Hale et al. | 175/40 |
| 5,160,370 | A * | 11/1992 | Suga et al. | 524/376 |
| 5,236,987 | A * | 8/1993 | Arendt | 524/287 |
| 5,277,862 | A * | 1/1994 | Steppan et al. | 264/257 |
| 5,286,774 | A * | 2/1994 | McGibbon et al. | 524/398 |
| 5,304,324 | A * | 4/1994 | Yoneda et al. | 516/33 |
| 5,334,673 | A * | 8/1994 | Wu | 473/378 |
| 5,453,267 | A * | 9/1995 | Kemp et al. | 424/59 |
| 5,476,890 | A * | 12/1995 | Heiss | 524/244 |
| 5,482,640 | A * | 1/1996 | Eberlein | 252/70 |
| 5,656,071 | A * | 8/1997 | Kappele et al. | 106/31.76 |
| 6,110,266 | A * | 8/2000 | Gonzalez-Blanco et al. | 106/31.65 |
| 6,117,024 | A * | 9/2000 | Dewanjee | 473/351 |
| 6,210,294 | B1 | 4/2001 | Wu | 473/377 |
| 6,395,467 | B1 | 5/2002 | Fahy et al. | 435/1.3 |
| 6,435,986 | B1 | 8/2002 | Wu et al. | 473/378 |

FOREIGN PATENT DOCUMENTS

| | | |
|---|---|---|
| DE | 2430022 B1 * | 10/1975 |
| GB | 1 524 613 | 9/1978 |
| JP | 03056571 A * | 3/1991 |
| JP | 11061012 A * | 3/1999 |
| JP | 11323221 A * | 11/1999 |

OTHER PUBLICATIONS

Derwent abstract ACC-NO: 1975-72594W, for DE 2430022 B1, (Oct. 23, 1975) Scharfe et al.*
JPO machine translation for JP 11061012 A.*
JPO machine translation for JP 11323221 A.*
USPTO obtained translation for JP 3-56571-A.*
"The Melting Point Alternation in α, ω-Alkanediamines: Interplay between Hydrogen Bonding and Hydrophobic Interactions", by Thalladi et al, Angew. Chem. Int. Ed. 2000, 39, No. 5, pp. 918-922.

* cited by examiner

*Primary Examiner*—Matthew A. Thexton
(74) *Attorney, Agent, or Firm*—Diane R. Meyers; Donald R. Palladino

(57) ABSTRACT

A liquid pigment dispersion is disclosed. The dispersion comprises a pigment dispersed in a blend of two or more active hydrogen-containing materials that together have a freezing point that is room temperature or below. The pigment remains dispersed in the blend, even if the dispersion is subjected to freezing and thawing. A curative blend comprising at least two active hydrogen-containing materials, which is liquid at room temperature, is also disclosed. The dispersions and curative blends of the present invention can be solvent-free. Resins and prepolymers comprising the curative blends of the invention, either pigmented or unpigmented, are also disclosed.

23 Claims, No Drawings

LIQUID PIGMENT DISPERSION AND CURATIVE AGENTS

FIELD OF THE INVENTION

The present invention is directed to a liquid, storage stable pigment dispersion. More specifically, the pigment dispersion contains a blend of active hydrogen-containing materials, which can serve as curative agents for various resins.

BACKGROUND INFORMATION

Polyurethanes, polyureas and other isocyanate-containing resins are widely used in numerous industries. These resins typically come in two categories, thermoset and thermoplastic. They are usually coreacted with an active hydrogen-containing material, such as an amine or glycol, to effect cure; this is particularly true for thermosets.

Some curing agents used in polyurethane and/or polyurea compositions have relatively high freezing points, which makes shipping and storage of these materials during the winter season problematic. The problem is compounded when the compositions include pigments. When certain curative/pigment blends have thawed from a frozen state, the solids separate and the quality of the pigment dispersed therein can be lost, as measured by the Hegman scale. The Hegman scale is a measurement of particle size, which is typically used to denote the degree of pigment dispersion. When a material completely loses its quality of dispersion (Hegman equals zero), the particle size of the material is generally about 100 microns or greater. Such a separated blend would need to be redispersed before it could be used. In cases where the pigment has undergone "hard settling", the pigment cannot be redispersed and the blend is unusable.

There remains a continuing need for curative agents, particularly those in which a pigment is dispersed, that can withstand lower storage and shipping temperatures. In addition, it would be advantageous to provide such agents that, even if they became frozen, can be thawed and used without the need to redisperse the pigment; it would be further advantageous to provide such agents that do not experience any substantial change or sacrifice in the properties they impart to the prepolymer or resin into which they are incorporated.

SUMMARY OF THE INVENTION

The present invention provides a liquid pigment dispersion comprising a pigment dispersed in a blend of two or more active hydrogen-containing materials. Each of the active hydrogen-containing materials may have a different freezing point; this encompasses embodiments in which the freezing points of the materials are different and embodiments in which the freezing points of the materials are the same. The combined freezing point of the active hydrogen-containing materials, however, will be such that the pigment dispersion is liquid at room temperature, that is 68° F. to 77° F., down to about 55° F. This range of temperatures, i.e. room temperature to 55° F., is referred to herein as "room temperature and below".

It is significant that the present pigment dispersions are liquid at room temperature and below, and in many embodiments at even lower temperatures, and furthermore that they are storage stable over a wider temperature range than other curative materials. "Storage stable", as used herein, refers to the ability of a dispersion, blend, composition or the like to resist freezing at temperatures down to about 55° F., and also refers to the ability of these compositions to maintain their properties even if they become frozen. For example, the storage stable dispersions, blends, and compositions of the present invention can be frozen to temperatures of down to −15° F. or lower, and still be usable, when thawed, without the need to redisperse. For example, the dispersions, blends and other embodiments of the present invention have been found to maintain their pigment dispersion quality even after freezing, and to retain their curative properties even if frozen. In addition, dispersions, blends and other embodiments of the present invention that have undergone a freeze/thaw cycle will still impart the same desirable properties to the prepolymers and resins into which they are incorporated, such as adhesive strength, shear/cut resistance, shore hardness, durability and the like. This is significant, as many curative materials comprising pigment lose their pigment dispersion quality upon freezing. For example, a blend of 1,4-butanediol and pigment will lose its pigment dispersion if frozen and thawed. Such pigment dispersions, when frozen and thawed, will require redispersion before they can be used, if they can even be used at all.

It will be understood by those skilled in the art that pigment dispersion is typically evaluated in terms of the "Hegman scale". As discussed above, the Hegman scale is a measure of particle size. The Hegman scale denotes the fineness of the dispersed pigment, i.e., the degree of dispersion and consistency of particle size. The scale runs from zero wherein the particle size is >100 microns, to eight wherein the particle size is too small to measure in microns. The measurement is taken by drawing down a sample on a grind block, the face of which is surfaced such that particles of a certain size will visibly protrude on the block at the designated intervals. A poor quality pigment dispersion (i.e. a Hegman measurement of less than 4) would denote that the pigment particles are large or that there are large agglomerates, which may limit the application of the dispersion. A good quality pigment dispersion (i.e. a Hegman measurement of 4 or greater) indicates a pigment dispersion that is widely usable in many applications.

DETAILED DESCRIPTION OF THE INVENTION

The present invention is directed to a liquid pigment dispersion comprising a pigment dispersed in a blend of two or more active hydrogen-containing materials, wherein each active hydrogen-containing material may have a different freezing point. In addition to being liquid at room temperature and below, the present pigment dispersions are also storage stable.

Any pigment can be used according to the present invention, absent compatibility problems. A particularly suitable pigment is titanium dioxide ($TiO_2$). Titanium dioxide can be particularly difficult to maintain in dispersion because it is often used in high concentrations; also, because of its relatively high density, it is prone to settling. Other pigments include but are not limited to inorganic pigments such as red or yellow iron oxides, carbon black, and ultramarine blue, and organic pigments such as phthalocyanine blues and greens, carbazole violets, and naphthol reds.

Alternatively, the pigment can be in the form of a premade colorant or tint, such as those commercially available from Polyone Corporation. These premade colorants or tints typically contain a pigment or pigments dispersed in a grind vehicle. The grind vehicles can be, for example, a high molecular weight polyol, dipropylene glycol dibenzoate, diethylene glycol adipate or other suitable compounds. It will be understood that certain grind vehicles may introduce small quantities of active hydrogen-containing groups to the present compositions; these quantities are not significant (i.e. <5% of the total active hydrogen groups) and are not included in the weight percents of active hydrogen-containing materials discussed below. Thus, any weight ratios, percentages or the like provided herein do not include active hydrogen-containing groups/materials that may be contributed by the grind vehicle. It will be further understood that many grind vehicles have very limited functionality or will be nonfunctional.

As noted above, the pigment is dispersed in a blend of active hydrogen-containing materials. An active hydrogen-containing material is one that contains a hydrogen that is reactive; such materials might have an active hydrogen, for example, by having a hydroxyl, primary amino, secondary amino or thiol group. The active hydrogen-containing materials are generally describable as monomers or oligomers, rather than polymers or resins. "Monomer" will be understood as referring to molecules or compounds having a relatively low molecular weight and a simple structure capable of conversion to a polymer, resin or elastomer by combination with itself or other similar molecules or compounds. An oligomer is a combination of only a few (i.e. 4 or less) monomers. A polymer, in contrast, comprises 5 or more of such units. For example, the active hydrogen-containing materials can have a number average molecular weight of between about 30 and 4000, such as between about 90 and 1000. The blend can include two or more of such materials. Each active hydrogen-containing material may have a different freezing point, and in many embodiments, each active hydrogen-containing material will have a different freezing point. For example, one active hydrogen-containing material can be solid at room temperature, while another active hydrogen-containing material in the blend can be liquid at room temperature. Any active hydrogen-containing materials can be used together in any amounts according to the present invention, so long as they are compatible, and so long as their combined freezing point is such that the resulting blend is liquid at room temperature and below. For example, the freezing point of the blend can be 60° F. or less, 55° F. or less, or 50° F. or less. In one embodiment, the active hydrogen-containing materials are selected so that the resulting dispersion is storage stable if the dispersion is subjected to temperatures below which it will freeze.

Specific examples of active hydrogen-containing materials include hydrogen-terminated compounds, such as diols or glycols. Diols having an odd number of carbon atoms may be particularly suitable, as may be diols having a pendant methyl group. Examples include, but are not limited to, ethylene glycol; diethylene glycol; polyethylene glycol; propylene glycol; 2-methyl-1,3-propanediol ("MPD"), 2-methyl-1,4-butanediol ("MBD"); dipropylene glycol; polypropylene glycol; 1,2-butanediol; 1,3-butanediol; 1,4-butanediol ("BDO"); 2,3-butanediol; 2,3-dimethyl-2,3-butanediol; trimethylolpropane; cyclohexyldimethylol; triisopropanolamine; tetra-(2-hydroxypropyl)ethylene diamine; diethylene glycol di-(aminopropyl)ether; 1,5-pentanediol; 1,6-hexanediol; 1,3-bis-(2-hydroxyethoxy)cyclohexane; 1,4-cyclohexyldimethylol; 1,3-bis-[2-(2-hydroxyethoxy) ethoxy]cyclohexane; 1,3-bis-{2-[2-(2-hydroxyethoxy) ethoxy]ethoxy}cyclohexane; polytetramethylene ether glycol having a molecular weight ranging from about 250 to about 3900; resorcinol-di-(beta-hydroxyethyl)ether and its derivatives; hydroquinone-di-(beta-hydroxyethyl)ether and its derivatives; 1,3-bis-(2-hydroxyethoxy)benzene; 1,3-bis-[2-(2-hydroxyethoxy)ethoxy]benzene; N,N-bis(β-hydroxypropyl)aniline; 2-propanol-1,1'-phenylaminobis; and mixtures thereof. The hydroxy-terminated active hydrogen-containing material may have a molecular weight of at least about 50. In one embodiment, the molecular weight of the hydroxy-terminated active hydrogen-containing material is about 2000 or less. In yet another embodiment, the hydroxy-terminated active hydrogen-containing material has a molecular weight of about 250 to about 3900. It should be understood that molecular weight, as used herein, is the absolute weight average molecular weight as would be understood by one of ordinary skill in the art.

Active hydrogen-containing materials according to the present invention can also include amine-terminated compounds. Suitable amine-terminated compounds include, but are not limited to, ethylene diamine; hexamethylene diamine; 1-methyl-2,6-cyclohexyl diamine; tetrahydroxypropylene ethylene diamine; 2,2,4- and 2,4,4-trimethyl-1,6-hexanediamine; 4,4'-bis-(sec-butylamino)-dicyclohexylmethane; 1,4-bis-(sec-butylamino)-cyclohexane; 1,2-bis-(sec-butylamino)-cyclohexane; derivatives of 4,4'-bis-(sec-butylamino)-dicyclohexylmethane; 4,4'-dicyclohexylmethane diamine; 1,4-cyclohexane-bis-(methylamine); 1,3-cyclohexane-bis-(methylamine); diethylene glycol di-(aminopropyl)ether; 2-methylpentamethylene-diamine; diaminocyclohexane; diethylene triamine; triethylene tetramine; tetraethylene pentamine; propylene diamine; 1,3-diaminopropane; dimethylamino propylamine; diethylamino propylamine; imido-bis-propylamine; monoethanolamine; diethanolamine; triethanolamine; monoisopropanolamine, diisopropanolamine; triisopropanolamine; isophoronediamine; 4,4'-methylenebis-(2-chloroaniline); 3,5-dimethylthio-2,4-toluenediamine; 3,5-dimethylthio-2,6-toluenediamine; 3,5-diethylthio-2,4-toluenediamine; 3,5-diethylthio-2,6-toluenediamine; 4,4'-bis-(sec-butylamino)-diphenylmethane and derivatives thereof; 1,4-bis-(sec-butylamino)-benzene; 1,2-bis-(sec-butylamino)-benzene; N,N'-dialkylamino-diphenylmethane; trimethyleneglycol-di-p-aminobenzoate; polytetramethyleneoxide-di-p-aminobenzoate; 4,4'-methylenebis-(3-chloro-2,6-diethyleneaniline); 4,4'-methylenebis-(2,6-diethylaniline); meta-phenylenediamine; paraphenylenediamine; cyclohexyldimethol; and mixtures thereof. In one embodiment, the amine-terminated active hydrogen-containing material is 4,4'-bis-(sec-butylamino)-dicyclohexylmethylene. In another embodiment, the amine-terminated active hydrogen-containing material has a molecular weight of about 64 or greater. In yet another embodiment, the molecular weight of the amine-terminated active hydrogen-containing material is about 2000 or less.

In one embodiment, when one of the active hydrogen-containing materials is an alcohol having a molecular weight less than 200, the other active hydrogen-containing material is not a dihydroxy compound having a molecular weight of between 204 and 500 and having an ester group. In another embodiment, the blends, dispersions and compositions of the present invention specifically exclude dimethyl sulfoxide.

It will be appreciated that many of the active hydrogen-containing materials listed above have relatively high freezing points, and are therefore solid at room temperature. For example, BDO has a freezing point of 68° F., hexamethylene diamine of 105.8° F., diethanolamine of 82.4° F., triethanolamine of 69.8° F., diisopropylamine of 73.4° F. and triisopropylamine of 111.2° F. Other listed diols and amines have freezing points less than room temperature, some considerably less. For example, MPD has a freezing point of −65° F., ethylene glycol of 9° F., dipropylene glycol of −58° F. and propylene glycol of −74° F. It will be appreciated that when various combinations of these diols and/or amines are blended, the freezing point of the blend will be such that the blend is liquid at room temperature and below, and in some cases even lower. Any combination or blend of active hydrogen-containing materials, not limited to those listed above, can be used according to the present invention, again so long as the freezing point of the blend is such that the dispersion is liquid at room temperature and below. It is within the skill of one practicing in the art to determine the freezing point of a blend using freezing point determination methods standard in the art. An empirical method of freezing point determination is to cool the sample, such as by surrounding it with an ice bath while stirring, and to record the temperature at regular intervals, such as every minute, until the material begins to solidify. As solidification occurs, the temperature begins to level off. This temperature is the freezing point. Analytical methods such as calorimetry, such as Differential Scanning Calorimetry (DSC), may also be used.

The present blends can comprise active hydrogen-containing materials that are all liquid at room temperature, or one or more that are liquid at room temperature and one or more that are solid at room temperature. In this latter embodiment, the material(s) that are liquid at room temperature can be used in an amount sufficient to reduce the freezing point of the material(s) that are solid at room temperature, such that the blend is liquid at room temperature and below. In one embodiment, the liquid at room temperature material is added to the solid at room temperature material in an amount of about 8 percent or greater by weight of the blend, such as in an amount of about 10 percent or greater by weight, or in an amount of about 12 percent or greater by weight, or even 14 percent or greater by weight of the blend. The "weight of the blend" refers only to the weight of the active hydrogen-containing materials. A particularly suitable embodiment includes 90 weight percent of a material that is solid at room temperature, such as BDO, and 10 percent by weight of a material that is liquid at room temperature, such as MPD or MBD. It will be appreciated that often a relatively minor portion of the blend need be liquid at room temperature in order to achieve the liquid, storage stable characteristics of the overall dispersion. This allows the present compositions to retain the excellent properties obtained with the solid at room temperature curative agents, without needing to worry about those agents solidifying or losing their Hegman grind if solidification occurs.

The pigment of the present invention generally comprises about 10 to 70 weight percent, such as about 15 to 55 weight percent, or about 20 to 25 weight percent, with weight percent being based on the total weight of the liquid pigment dispersion. The active hydrogen-containing material blend typically comprises about 30 to 90 weight percent of the total formula, such as about 50 to 80 weight percent, or about 70 weight percent, with weight percent being based on the total weight of the liquid pigment dispersion. In addition, the liquid pigment dispersions of the present invention can further comprise additional additives standard in the art in a weight percent of up to about 10, again with weight percent being based upon the total weight of the dispersion. Suitable additives include, for example, wetting additives, light stabilizers and catalysts. Wetting additives would be added to more effectively disperse the pigment or pigments, and are commercially available from Byk-Chemie, Crompton Corporation, and others. Light stabilizers would be added to prevent photo-degradation upon exposure to the environment and are commercially available from Ciba, Cytec, and others. Hindered amine light stabilizers are particularly suitable because they will react with UV light that reaches the surface of the material, converting it to thermal energy, thus slowing any photo-degradation. A catalyst can be added to accelerate cure time; suitable catalysts are commercially available from Air Products Corporation. Particularly suitable for use in the present invention are tin-containing catalysts.

It will be appreciated that the liquid pigment dispersions of the present invention can be formulated so as to be solvent-free. "Solvent-free", as used herein, means 1 weight percent or less of solvent, such as water, alcohol, ketones, aromatic solvents, esters, and the like.

It will be appreciated that the active hydrogen-containing materials discussed above find particular application as curative agents for resins containing isocyanate groups such as polyurethanes and polyureas. Accordingly, the present invention is further directed to a curative blend comprising a first active hydrogen-containing material and a second active hydrogen-containing material, wherein the freezing point of the blend is less than 68° F. Any active hydrogen-containing material, such as the hydroxy-terminated and/or amine terminated materials described above, can be used. Such curative blends can further comprise additional active hydrogen-containing materials and/or any of the pigments or additives discussed above, and can also be formulated to be essentially solvent-free. Any suitable polyurethane or polyurea composition can be cured with the liquid pigment dispersion or curative blend of the present invention.

It will be appreciated that polyurethane-based resins according to the present invention can be prepared by reacting at least one polyurethane prepolymer and the dispersion or curative agent described above; the polyurethane prepolymer will be understood as being a product formed by a reaction between at least one polyol and at least one diisocyanate. The resins need not be formed through the use of a prepolymer, however; any method known in the art can be used. In one embodiment, the polyurethane-based compositions of the invention are saturated and, thus comprise the reaction product of at least one saturated polyurethane prepolymer formed from at least one saturated diisocyanate and at least one saturated polyol, and a liquid pigment dispersion or curative blend of the present invention that contains at least one saturated active hydrogen-containing material.

Any isocyanate known in the art is suitable for use with the polyurethane prepolymer, including aliphatic, cycloaliphatic, araliphatic, derivatives thereof, and combinations of these compounds having two or more isocyanate (NCO) groups per molecule. The isocyanates may be organic, modified organic, organic polyisocyanate-terminated prepolymers, low free isocyanates, and mixtures thereof. The isocyanate-containing reactable component may also include any isocyanate-functional monomer, dimer, trimer, or multimeric adduct thereof, prepolymer, quasi-prepolymer, or mixtures thereof. Isocyanate-functional compounds may include monoisocyanates or polyisocyanates that include any isocyanate functionality of two or more. Suitable isocyanate-containing components include diisocyanates having the generic structure O═C═N—R—N═C═O, where R is preferably a cyclic, linear or branched hydrocarbon moiety containing from about 1 to 20 carbon atoms. The diisocyanate may also contain one or more cyclic groups or one or more phenyl groups. When multiple cyclic groups are present, linear and/or branched hydrocarbons containing from about 1 to 10 carbon atoms can be present as spacers between the cyclic or aromatic groups. In some cases, the cyclic or aromatic group(s) may be substituted at the 2-, 3-, and/or 4-positions. Substituted groups may include, but are not limited to, halogens, primary, secondary, or tertiary hydrocarbon groups, or a mixture thereof.

Examples of saturated diisocyanates that can be used in the polyurethane prepolymer include, but are not limited to, ethylene diisocyanate; propylene-1,2-diisocyanate; tetramethylene diisocyanate; tetramethylene-1,4-diisocyanate; 1,6-hexamethylene-diisocyanate ("HDI"); octamethylene diisocyanate; decamethylene diisocyanate; 2,2,4-trimethylhexamethylene diisocyanate; 2,4,4-trimethylhexamethylene diisocyanate; dodecane-1,12-diisocyanate; dicyclohexylmethane diisocyanate; cyclobutane-1,3-diisocyanate; cyclohexane-1,2-diisocyanate; cyclohexane-1,3-diisocyanate; cyclohexane-1,4-diisocyanate; methyl-cyclohexylene diisocyanate ("HTDI"); 2,4-methylcyclohexane diisocyanate; 2,6-methylcyclohexane diisocyanate; 4,4'-dicyclohexyl diisocyanate; 2,4'-dicyclohexyl diisocyanate; 1,3,5-cyclohexane triisocyanate; isocyanatomethylcyclohexane isocyanate; 1-isocyanato-3,3-5-trimethyl-5-isocyanatomethylcyclohexane; isocyanatoethylcyclohexane isocyanate; bis(isocyanatomethyl)-cyclohexane diisocyanate; 4,4'-bis(isocyanatomethyl) dicyclohexane; 2,4'-bis(isocyanatomethyl)dicyclohexane; isophoronediisocyanate ("IPDI"); triisocyanate of HDI; triisocyanate of 2,2,4-trimethyl-1,6-hexane diisocyanate ("TMDI"); 4,4'-dicyclohexylmethane diisocyanate ("$H_{12}$MDI"); 2,4-hexahydrotoluene diisocyanate; 2,6-hexahydrotoluene diisocyanate; aromatic aliphatic isocyanate, such 1,2-, 1,3-, and 1,4-xylene diisocyanate; meta-tetramethylxylene diisocyanate ("m-TMXDI"); para-tetramethylxylene diisocyanate ("p-TMXDI"); trimerized isocyanurate of any polyisocyanate, such as isocyanurate of toluene diisocyanate, trimer of diphenylmethane diisocyanate, trimer of tetramethylxylene diisocyanate, isocyanurate of hexamethylene diisocyanate, and mixtures thereof; dimerized uredione of any polyisocyanate, such as uredione of toluene diisocyanate, uredione of hexamethylene diisocyanate, and mixtures thereof; modified polyisocyanate derived from the above isocyanates and polyisocyanates; and mixtures thereof. In one embodiment, the saturated diisocyanates include IPDI, $H_{12}$MDI, HDI, or a combination thereof.

Examples of unsaturated diisocyanates that can be used according to the present invention include, but are not limited to, substituted and isomeric mixtures including 2,2'-, 2,4'- and 4,4'-diphenylmethane diisocyanate ("MDI"); 3,3'-dimethyl-4,4'-biphenylene diisocyanate ("TODI"); toluene diisocyanate ("TDI"); polymeric MDI; carbodiimide-modified liquid 4,4'-diphenylmethane diisocyanate; para-phenylene diisocyanate ("PPDI"); meta-phenylene diisocyanate ("MPDI"); triphenyl methane-4,4'-, and triphenyl methane-4,4"-triisocyanate; naphthylene-1,5-diisocyanate; 2,4'-, 4,4'-, and 2,2-biphenyl diisocyanate; polyphenyl polymethylene polyisocyanate ("PMDI"); mixtures of MDI and PMDI; and mixtures of PMDI and TDI.

Any saturated polyol available to one of ordinary skill in the art is suitable for use in the polyurethane prepolymer. Exemplary polyols include, but are not limited to, polyether polyols, polycaprolactone polyols, polyester polyols, polycarbonate polyols, hydrocarbon polyols, and mixtures thereof. Suitable saturated polyether polyols for use in the present invention include, but are not limited to, polytetramethylene ether glycol ("PTMEG"); PTG-L; poly(oxyethylene)glycol; poly(oxypropylene) glycol; poly(ethylene oxide capped oxypropylene)glycol; and mixtures thereof.

Saturated polycaprolactone polyols include, but are not limited to, diethylene glycol initiated polycaprolactone; propylene glycol initiated polycaprolactone; 1,4-butanediol initiated polycaprolactone; trimethylol propane initiated polycaprolactone; neopentyl glycol initiated polycaprolactone; 1,6-hexanediol initiated polycaprolactone; PTMEG initiated polycaprolactone; and mixtures thereof.

Suitable saturated polyester polyols include, but are not limited to, polyethylene adipate glycol; polyethylene propylene glycol; polybutylene adipate glycol; polyethylene butylene adipate glycol; polyhexamethylene adipate glycol; polyhexamethylene butylene adipate glycol; and mixtures thereof. An example of a polycarbonate polyol that may be used with the present invention includes, but are not limited to, poly(hexamethylene carbonate)glycol.

Hydrocarbon polyols include, but are not limited to, hydroxy-terminated liquid isoprene rubber (LIR), hydroxy-terminated polybutadiene polyol, saturated hydroxy-terminated hydrocarbon polyols, and mixtures thereof. Other aliphatic polyols that may be used to form the prepolymer of the invention include, but are not limited to, glycerols; castor oil and its derivatives; Kraton polyols; acrylic polyols; acid functionalized polyols based on a carboxylic, sulfonic, or phosphoric acid groups; dimer alcohols converted from the saturated dimerized fatty acid; and mixtures thereof.

The number of unreacted NCO groups in the polyurethane prepolymer may be varied to control such factors as the speed of the reaction, the resultant hardness of the composition, and the like. For instance, the number of unreacted NCO groups in the polyurethane prepolymer of isocyanate and polyol may be less than about 14 percent. In one embodiment, the polyurethane prepolymer has from about 5 percent to about 11 percent unreacted NCO groups, such as from about 6 to about 9.5 percent unreacted NCO groups. In one embodiment, the percentage of unreacted NCO groups in the polyurethane polymer may be about 7.5 percent or less, such as about 7 percent or less. In another embodiment, the unreacted NCO content is from about 2.5 percent to about 7.5 percent, such as from about 4 percent to about 6.5 percent.

The compositions of the invention may also be polyurea-based, which are distinctly different from polyurethane compositions, but also result in desirable characteristics when used in similar applications. The polyurea-based compositions are saturated in one embodiment.

Without being bound to any particular theory, it is now believed that substitution of the long chain polyol segment in the polyurethane prepolymer with a long chain polyamine oligomer soft segment to form a polyurea prepolymer improves shear, cut, and resiliency, as well as adhesion to other components. The polyurea compositions of the present invention may be formed from the reaction product of an isocyanate and polyamine prepolymer crosslinked with the dispersion or blend of the present invention. Again, prepolymers need not be used. For example, polyurea-based compositions of the invention may be prepared from at least one isocyanate, at least one polyether amine, and a liquid pigment dispersion or curative blend of the present invention.

Any polyamine available to one of ordinary skill in the art is suitable for use in the polyurea prepolymer. Polyether amines are particularly suitable for use, especially in the "prepolymer" embodiment. As used herein, "polyether amines" refer to at least polyoxyalkyleneamines containing primary amino groups attached to the terminus of a polyether backbone. Due to the rapid reaction of isocyanate and amine, and the insolubility of many urea products, the selection of diamines and polyether amines may be limited to those allowing the successful formation of the polyurea prepolymers. In one embodiment, the polyether backbone is based on tetramethylene, propylene, ethylene, trimethylolpropane, glycerin, and mixtures thereof.

Suitable polyether amines include, but are not limited to, methyldiethanolamine; polyoxyalkylenediamines such as polytetramethylene ether diamines, polyoxypropylenetriamine, and polyoxypropylene diamines; poly(ethylene oxide capped oxypropylene)ether diamines; propylene oxide-based triamines; triethyleneglycoldiamines; trimethylolpropane-based triamines; glycerin-based triamines; and mixtures thereof. In one embodiment, the polyether amine used to form the prepolymer is JEFFAMINE D2000, commercially available from Huntsman Corporation of Austin, Tex.

The molecular weight of the polyether amine for use in the polyurea prepolymer may range from about 100 to about 5000, such as 200 or greater, or about 230 or greater. In another embodiment, the molecular weight of the polyether amine is about 4000 or less, such as about 3000 or less. In yet another embodiment, the molecular weight of the polyether amine is about 600 or greater. In yet another embodiment, the molecular weight of the polyether amine is about 1000 to about 3000, such as about 1500 to about 2500. Because lower molecular weight polyether amines may be prone to forming solid polyureas, a higher molecular weight oligomer, such as JEFFAMINE D2000, is often more suitable In one embodiment, the polyether amine has the generic structure:

$$H_2N\underset{\substack{|\\CH_3}}{CH}CH_2 — (OCH_2\underset{\substack{|\\CH_3}}{CH})_x — NH_2$$

wherein the repeating unit x has a value ranging from about 1 to about 70, such as from about 5 to about 50, or about 12 to about 35.

In another embodiment, the polyether amine has the generic structure:

$$H_2N\underset{\substack{|\\CH_3}}{CH}CH_2 — (O\underset{\substack{|\\CH_3}}{CH}CH_2)_x — (OR)_y — (OCH_2\underset{\substack{|\\CH_3}}{CH})_z — NH_2$$

wherein the repeating units x and z have combined values from about 3.6 to about 8 and the repeating unit y has a value ranging from about 9 to about 50, and wherein R is —$(CH_2)_a$—, where "a" may be a repeating unit ranging from about 1 to about 10.

In yet another embodiment, the polyether amine has the generic structure:

$$H_2N—(R)—O—(R)—O—(R)—NH_2$$

wherein R is —$(CH_2)_a$—, and "a" may be a repeating unit ranging from about 1 to about 10.

As briefly discussed above, some amines may be unsuitable for reaction with the isocyanate because of the rapid reaction between the two components. In particular, shorter chain amines are fast reacting. In one embodiment, however, a hindered secondary diamine may be suitable for use in the prepolymer. Without being bound to any particular theory, it is believed that an amine with a high level of stearic hindrance, e.g., a tertiary butyl group on the nitrogen atom, has a slower reaction rate than an amine with no hindrance or a low level of hindrance. For example, 4,4'-bis-(sec-butylamino)-dicyclohexylmethane (CLEARLINK 1000, commercially available from UOP corporation) may be suitable for use in combination with an isocyanate to form the polyurea prepolymer.

Any isocyanate available to one of ordinary skill in the art is suitable for use in the polyurea prepolymer. Suitable isocyanates are described above with reference to the polyurethane composition.

The polyurethane and polyurea prepolymers, if used, may be formed with the liquid pigment dispersions or curative blends described above, which can include, for example, hydroxy-terminated materials, amine-terminated materials, and mixtures thereof. Accordingly, the present invention is further directed to polyurethane and polyurea prepolymers so formed.

Depending on the type of curatives in the dispersion/blend, the polyurethane composition may be thermoplastic or thermoset in nature. For example, polyurethane prepolymers cured with a diol or secondary diamine with 1:1 stoichiometry are thermoplastic in nature. Thermoset polyurethanes, on the other hand, are generally produced from a prepolymer cured with a primary diamine or polyfunctional glycol.

In addition, the type of curative(s) in the dispersion/blend determine whether the polyurethane composition is polyurethane-urethane or a polyurethane-urea. For example, a polyurethane prepolymer cured with hydroxy-terminated materials is polyurethane-urethane because any excess isocyanate groups will react with the hydroxyl groups to create more urethane linkages. In contrast, if an amine-terminated material is used with the polyurethane prepolymer, the excess isocyanate groups will react with the amine groups to create urea linkages.

It will be appreciated that the liquid pigment dispersions of the present invention can be made in at least two different ways. In the first method, a pigment is incorporated by blending, such as with a cowles grind or a mill grind, into a blend of active hydrogen-containing materials. The pigment can be added to a first-active hydrogen-containing material, and the second or more active hydrogen materials can be added later, or all of the active hydrogen-containing materials can first be blended, and the pigment added thereto. Alternatively, a pigment commercially available in a grind vehicle can be mixed in with the active hydrogen-containing blend of the present invention; again, the pigment/grind vehicle can be added to a first active hydrogen-containing material and the second or more active hydrogen materials can be added later, or the pigment/grind vehicle can be added to all of the active hydrogen-containing materials that have already been blended. In this embodiment, simple mixing would be used; because the pigment is already dispersed in the grind vehicle, there would be no need to grind the pigment in with the blend. In either embodiment, the standard additives, if used, can be added at any time.

As used herein, unless otherwise expressly specified all numbers such as those expressing values, ranges, amounts or percentages may be read as if prefaced by the word "about", even if the term does not expressly appear. Plural encompasses singular and vice versa. Also, as used herein, the term "polymer" is meant to refer to oligomers and both homopolymers and copolymers; the prefix "poly" refers to two or more.

EXAMPLES

The following examples are intended to illustrate the invention, and should not be construed as limiting the invention in any way. Weight percents are based upon the total weight of the formulation.

Example 1

Pigment dispersions according to the present invention were prepared using the components listed in Tables 1 and 2, as indicated:

TABLE 1

| Material | Percent by weight of total formula |
|---|---|
| 1,4 Butanediol[1] | 69.44% |
| Titanium Dioxide White Pigment[2] | 23.42% |
| Ultramarine Blue Pigment[3] | 0.23% |
| SILWET L-7210 wetting additive[4] | 0.10% |
| Hindered Amine Light Stabilizer[5] | 2.13% |
| Tin Catalyst[6] | 4.68% |

[1]Obtained from Ashland Chemical.
[2]Obtained from Dupont Corp.
[3]Obtained from Whittaker, Clark, and Daniels
[4]Polyalkeneoxide modified polydimethylsiloxane, obtained from Crompton Corp.
[5]TINUVIN 292, obtained from Ciba Geigy.
[6]Dibutyl Tin Dilaurate, obtained from Air Products.

The pigments were dispersed by means of a Cowles blade to a Hegman grind of 6.0. This product, referred to as Component A below, was further blended with a second active hydrogen-containing component, "Component B" as shown in Table 2.

TABLE 2

| Sample | % by weight of Component A | 1,4 BDO % by weight | Component B | % by weight of Component B | Freezing point[7] |
|---|---|---|---|---|---|
| 1 | 100% | 69.4% | none | 0 | 64° F. |
| 2 | 90% | 62.5% | Ethylene Glycol | 10% | 45° F. |
| 3 | 90% | 62.5% | Dipropylene Glycol | 10% | 50° F. |
| 4 | 90% | 62.5% | Propylene Glycol | 10% | 50° F. |
| 5 | 90% | 62.5% | 2-methyl-1,3 propanediol | 10% | 50° F. |

[7]Freezing point was determined by cooling the material in an ice bath and recording the temperature at which solidification was first noticed.

It was visually observed in Sample 5 that the blend was not only lower in freezing point than the original curative blend, but it also formed a soft semi-solid rather than crystallizing.

As can be seen in Table 2, the blends comprising only 10 weight percent of Component B served to considerably lower the freezing point of the pigment dispersion.

Example 2

A titanium white pigment dispersion, using a tin catalyst for faster reaction, was prepared by first making a paste, referred to as Component C below, with the following components:

TABLE 3

| Material | Percent by weight of total formula |
|---|---|
| 1,4 Butanediol | 53.78% |
| $TiO_2$ White Pigment | 46.02% |
| SILWET L-7210 wetting additive | 0.20% |

The pigment was dispersed by means of a Cowles blade to a Hegman grind of 6.0. The paste was then formulated into a blend according to the present invention with the following components:

TABLE 4

| Sample | Component C % by weight | 1,4 BDO % by weight | 2-methyl, 1–3 propanediol % by weight | Tin Catalyst % by weight | Freezing point |
|---|---|---|---|---|---|
| 6 | 57.3% | 37.5% | 0 | 5.3% | 66° F. |
| 7 | 57.3% | 36.8% | 0.7% | 5.3% | 66° F. |
| 8 | 57.3% | 34.1% | 3.4% | 5.3% | 58° F. |
| 9 | 57.3% | 30.7% | 6.8% | 5.3% | 53° F. |
| 10 | 57.3% | 23.8% | 13.6% | 5.3% | 42° F. |

It was visually observed that Samples 9 and 10 were not only lower in freezing point than Sample 6, with BDO alone, but they also formed a soft semi-solid rather than crystallizing. Also, greater than 0.7 weight percent of MPD was needed to affect the freezing point of the blend.

Samples 6–10 were kept in a freezer for 72 hours, where the temperature ranged between −14° F. and +14° F. The samples were then thawed at room temperature and the pigment dispersion was measured upon thawing. Table 5 lists the Hegman value after one freeze-thaw cycle.

TABLE 5

| Sample | Hegman before freezing: | Hegman after freezing: |
|---|---|---|
| 6 | 6.0 | 0 with large agglomerates |
| 7 | 6.0 | 0 with large agglomerates |
| 8 | 6.0 | 0 with less agglomerates |
| 9 | 6.0 | 4.0 very smooth, homogenous |
| 10 | 6.0 | 5.0 very smooth, homogenous |

As shown in Table 5, Samples 9 and 10 were usable after freezing and thawing without having to redisperse the pigment via high speed agitation or mill grinding.

Example 3

An organic red pigment dispersion, referred to as Component D below, was prepared by making a paste using the following components:

TABLE 6

| Material | Percent by weight of total formulation |
|---|---|
| 1,4 Butanediol | 78.26% |
| Novoperm Red Pigment[8] | 21.60% |
| SILWET L-7605 wetting additive | 0.14% |

[8]Obtained from Clariant Corp.

The pigment was dispersed by means of a Cowles blade to a Hegman grind of 5.0. The paste was then formulated into a blend according to the present invention with the following components:

TABLE 7

| Sample | Component D % by weight | 1,4 BDO % by weight | 2-methyl,1-3 propanediol % by weight | Freezing point |
|---|---|---|---|---|
| 11 | 66.7% | 33.3% | 0 | 66° F. |
| 12 | 66.7% | 32.5% | 0.8% | 66° F. |
| 13 | 66.7% | 29.1% | 4.2% | 58° F. |
| 14 | 66.7% | 24.8% | 8.5% | 53° F. |
| 15 | 66.7% | 16.2% | 17.1% | 42° F. |

It was visually observed that Samples 14 and 15 were not only lower in freezing point than Sample 11, with BDO alone, but they also formed a soft semi-solid rather than crystallizing.

Samples 11–15 were kept in a freezer for 72 hours, where the temperature ranged between −14° F. and +14° F. The samples were then thawed at room temperature and the pigment dispersion was measured upon thawing. Table 8 illustrates the Hegman grind after one freeze-thaw cycle run.

TABLE 8

| Sample | Hegman grind before freezing: | Hegman grind after freezing: |
|---|---|---|
| 11 | 5.0 | 0 with large agglomerates |
| 12 | 5.0 | 0 with large agglomerates |
| 13 | 5.0 | 0 with less agglomerates |
| 14 | 5.0 | 4.0 very smooth, homogenous |
| 15 | 5.0 | 5.0 very smooth, homogenous |

As shown in Table 8, Samples 14 and 15 were usable after freezing and thawing without having to redisperse the pigment through high speed agitation or mill grind.

Example 4

A pre-manufactured white-violet colorant, HCC-15181 white-violet dispersion from Polyone Corporation, was used for this example. The colorant contains titanium dioxide white, a small amount of carbazole violet 23, and a high molecular weight polyol grind vehicle. The HCC-15181 was formulated with polytetramethylene ether glycol (PTMEG) (weight average molecular weight 1000), and 1,2-butanediol (freezing point, −173° F.) as shown in Table 9.

TABLE 9

| Sample | HCC-15181 % by weight | PTMEG 1000 % by weight | 1,2 Butanediol % by weight | Freezing Point |
|---|---|---|---|---|
| 16 | 16.7% | 83.3% | 0% | 64° F. |
| 17 | 16.7% | 82.5% | 0.8% | 58° F. |
| 18 | 16.7% | 79.2% | 4.1% | 58° F. |
| 19 | 16.7% | 75.0% | 8.3% | 58° F. |
| 20 | 16.7% | 66.6% | 16.7% | 58° F. |

All of the samples were homogenous in appearance after freezing; no visible separation or crystallization was seen.

Whereas particular embodiments of this invention have been described above for purposes of illustration, it will be evident to those skilled in the art that numerous variations of the details of the present invention may be made without departing from the invention as defined in the appended claims.

What is claimed is:

1. A pigment dispersion that is liquid at room temperature and below comprising:

a pigment dispersed in a blend of two or more active hydrogen-containing materials, wherein each active hydrogen-containing material may have a different freezing point, wherein the Hegman measurement of the dispersion after one freeze-thaw cycle is ≧4, and the dispersion comprises 1 weight percent or less of water.

2. The dispersion of claim 1, wherein the pigment is titanium dioxide.

3. The dispersion of claim 1, wherein the pigment is contained in a grind vehicle prior to dispersion.

4. The dispersion of claim 1, wherein each active hydrogen-containing material has a different freezing point.

5. The dispersion of claim 4, wherein a first active hydrogen-containing material is solid at room temperature and a second active hydrogen-containing material is liquid at room temperature.

6. The dispersion of claim 1, wherein one of the active hydrogen-containing materials is a diol having an odd number of carbons.

7. The dispersion of claim 1, wherein the diol comprises a pendant methyl group.

8. The dispersion of claim 7, wherein the diol comprises 2-methyl-1,3-propanediol, 2-methyl-1,4-butanediol or mixtures thereof.

9. The dispersion of claim 1, wherein the freezing point of the dispersion is 55° F. or less.

10. The dispersion of claim 9, wherein the freezing point of the dispersion is 50° F. or less.

11. The dispersion of claim 1, wherein the dispersion comprises two active hydrogen-containing materials and the weight ratio of the first to second active hydrogen-containing material is 86 to 92:8 to 14.

12. The dispersion of claim 1, wherein the dispersion comprises two active hydrogen-containing materials and wherein the first active hydrogen-containing material is 1,4-butanediol and the second active hydrogen-containing material is 2-methyl-1,3-propanediol.

13. The dispersion of claim 1, wherein the pigment is present in a weight percent of 10 to 70, and the blend is present in a weight percent of 30 to 90, wherein weight percent is based on total weight of the dispersion.

14. The dispersion of claim 13, wherein the pigment is present in a weight percent of 15 to 50, and the blend is present in a weight percent of 50 to 85, wherein weight percent is based on total weight of the dispersion.

15. A curative blend comprising a pigment dispersion comprising a pigment dispersed in:

a) a first active hydrogen-containing material; and b) a second active hydrogen-containing material wherein (i) the active hydrogen-containing materials have different freezing points, (ii) the freezing point of the blend is 60° F. or less, and (iii) the Hegman measurement of the dispersion after one freeze-thaw cycle is ≧4.

16. The curative blend of claim 15, wherein the second active hydrogen-containing material is a diol having an odd number of carbons.

17. The curative blend of claim 16, wherein the diol comprises a pendant methyl group.

18. The curative blend of claim 17, wherein the diol comprises 2-methyl-1,3-propanediol, 2-methyl-1,4-butanediol or mixtures thereof.

19. The curative blend of claim 15, wherein the first active hydrogen-containing material is 1,4-butanediol and the second active hydrogen-containing material is 2-methyl-1,3-propanediol.

20. The curative blend of claim 15, wherein the blend comprises 1 weight percent or less of water.

21. A pigment dispersion that can be frozen, thawed, and used without redispersing the pigment, wherein (i) the Hegman measurement of the dispersion after one freeze-thaw cycle is ≧4, (ii) the dispersion comprises a blend of two or more active hydrogen containing materials, and (iii) the dispersion comprises 1 weight percent or less of water.

22. The dispersion of claim 21, wherein a first active hydrogen-containing material is solid at room temperature and a second active hydrogen-containing material is liquid at room temperature.

23. The dispersion of claim 21, wherein the Hegman measurement of the dispersion after one freeze-thaw cycle is ≧5.

* * * * *